(12) United States Patent
Lin

(10) Patent No.: US 10,588,448 B2
(45) Date of Patent: Mar. 17, 2020

(54) MODULAR FILTER FOR A VACUUM MUG

(71) Applicant: Shin-Shuoh Lin, Laguna Hills, CA (US)

(72) Inventor: Shin-Shuoh Lin, Laguna Hills, CA (US)

( * ) Notice: Subject to any disclaimer, the term of this patent is extended or adjusted under 35 U.S.C. 154(b) by 3 days.

(21) Appl. No.: 15/199,984

(22) Filed: Jul. 1, 2016

(65) Prior Publication Data

US 2017/0290456 A1 Oct. 12, 2017

Related U.S. Application Data

(60) Provisional application No. 62/320,478, filed on Apr. 9, 2016.

(51) Int. Cl.
*A47J 31/06* (2006.01)
(52) U.S. Cl.
CPC .................. *A47J 31/0626* (2013.01)
(58) Field of Classification Search
CPC ..... A47J 31/06; A47J 31/0626; A47J 31/0636
USPC .............................................. 210/236, 232.2
See application file for complete search history.

(56) References Cited

U.S. PATENT DOCUMENTS

| | | | |
|---|---|---|---|
| 2014/0251153 A1* | 9/2014 | Tien ..................... | A47J 31/0636 99/322 |
| 2015/0173557 A1* | 6/2015 | Jang .................... | A47J 31/0636 426/82 |
| 2015/0322389 A1* | 11/2015 | Anderson .............. | A61B 50/10 99/276 |
| 2016/0120355 A1* | 5/2016 | Shen ................... | A47J 31/0626 99/322 |

* cited by examiner

*Primary Examiner* — Benjamin M Kurtz
(74) *Attorney, Agent, or Firm* — Alexander Chen, Esq.; Agnew International Patent & Trademark Law Firm

(57) ABSTRACT

A modular filter for a vacuum mug comprises a mug cap and at least one filter basket. The mug cap's bottom opening has a cylindrical shape whose outer wall is threaded. The filter basket comprises a cylindrical top plate, at least one vertical post, and a cylindrical bottom plate. The vertical posts are disposed equidistantly around the perimeter of the top and bottom plates. The cylindrical top plate, vertical posts, and cylindrical bottom plate are fused together to form a cylindrical cage structure. The gaps between said vertical posts are covered with stainless steel mesh screens. The top plate's inner wall is threaded for mating with the threads on the outer wall of the mug cap's bottom opening. The bottom plate comprises of top and bottom halves wherein the bottom half is inset and its outer wall is threaded.

15 Claims, 14 Drawing Sheets

MODULAR FILTER FOR A VACUUM MUG

INCORPORATION BY REFERENCE

This application claims the benefit of priority under 35 U.S.C. 119(e) to the filing date of U.S. provisional patent application No. 62/320,478, titled "Methods and System for Making Vacuum Mug Modular Filters," which was filed on Apr. 9, 2016, and which is incorporated herein by reference in its entirety.

FIELD OF THE INVENTION

The present invention relates to beverage containers, and more specifically, to vacuum thermal mugs for preserving hot or cold beverages.

BACKGROUND OF THE INVENTION

Coffee and tea pots have been used for centuries to brew coffee or tea. The common method has been pouring hot water over the coffee grinds or tea leafs, and allowing the water to infuse and extract the soluble solids from the brew product. A later improvement provided a straining means located near the opening's neck permitting the brewing to take place without having to sift the brew leftover from the beverage. This improvement was advantageous but required removing the straining device prior to pouring. This drawback has been overcome with a stopper/cap that comprises both an opening for pouring the beverage and an opening for the strainer/filter.

As people get busier, they do not have time for brewing a perfect cup of coffee or tea notwithstanding a brewing pot that conveniently separates the brew leftover and the brew. Furthermore, they also want to keep their beverages warmer longer so they can get the best tastes. These desires have been met with a vacuum mug, or thermal mug, that insulates the beverage inside from the temperature outside, and has become a modern convenience that busy coffee or tea drinkers cannot function without. A vacuum mug with a stopper cap that comprises both a strainer or filter, and an opening for sipping has allowed a coffee or tea drinker to brew her coffee or tea on the go as if the user takes a brewing pot with her. The vacuum mug keeps the hot water hot, so the coffee or tea inside the strainer filter has time to brew while the user travels to the workplace.

The more convenient and functionally better vacuum mugs get, the more often people use them. Thus, naturally, they want their mugs to be ever larger or taller, to contain larger quantity of their drinks, so that they do not have to refill their mugs so often. Since the mugs are getting larger, they post a problem of inconsistent quality of the brewed beverage. For example, over extraction, due to brewing ground coffee in consistently hot water for a long period, results in intensely bitter coffee, while under extracted coffee, due to cooler water and/or shorter brewing period, is usually sour and lacking in complexity. With a larger or taller mug, this problem will be exacerbated where a small strainer/filter is attached under the cap near the top, and half empty beverage is at the bottom of the tall mug, and the brewing stops when the user drinks too fast. This scenario is actually common when people are busier.

However, a single deep filter will not be a good solution either because the entire amount of the brew product stay submerged at the bottom of the filter, and the longer the coffee or tea is submerged in the water, the longer the brewing time and, thus, the more likely an over extraction, and bitter beverages. Thus, it is desirable that the user has some finer control of the brewing.

Furthermore, for drinkers who like to add flavor ingredients to their beverages, they do not have a way to add the flavor ingredients except putting the ingredients directly into the coffee or tea leaves before brewing. In some instances, mixing flavor ingredients and brew product Is not desirable. In other instances, submerging the flavor ingredients in the beverage for a long period is not desirable. Perhaps, in these instances the drinker only wants a mild flavor.

OBJECT OF THE INVENTION

Accordingly, it is the object of this invention to provide a vacuum mug that allows brewing and enjoying the brew while traveling.

It is the object of this invention to provide a vacuum mug that maintains the temperature of the contained beverage for brewing effectiveness and taste.

It is the object of this invention to provide a vacuum mug that separates the brew leftover and the brew without the need of sifting the brew leftover from the brew.

It is an object of the invention to provide a vacuum mug that allows immediate beverage consumption without the need of removing the brew leftover.

It is an object of the invention to provide a vacuum mug that allows customizable taste of the brew.

It is an object of the invention to provide a vacuum mug that allows multiple strainers/filters to be attached.

It is an object of the invention to provide a vacuum mug that allows strainers/filters to be stacked vertically.

SUMMARY OF INVENTION

A modular filter for a vacuum mug comprises a mug cap and at least one filter basket. The mug cap's bottom opening has a cylindrical shape whose outer wall is threaded. The filter basket comprises a cylindrical top plate, at least one vertical post, and a cylindrical bottom plate. The vertical posts are disposed equidistantly around the perimeter of the top and bottom plates. The cylindrical top plate, vertical posts, and cylindrical bottom plate are fused together to form a cylindrical cage structure. The gaps between said vertical posts are covered with stainless steel mesh screens. The top plate's inner wall is threaded for mating with the threads on the outer wall of the mug cap's bottom opening. The bottom plate comprises of top and bottom halves wherein the bottom half is inset and its outer wall is threaded.

In one embodiment, the filter basket's bottom is perforated. In another embodiment, the filter basket's bottom is imperforated. In yet another embodiment, the filter basket has an open bottom.

In some implementation of this invention, at least one tap is disposed on the outer wall of the mug cap's bottom opening, and at least one L-shaped gap is disposed on the wall of the top plate. The gap is disposed so that it can receive the tap. Furthermore, at least one tap is disposed on the outer wall of the bottom half of the bottom plate.

In another implementation of this invention, the modular filter comprises an cylindrical end cap, whose top cylindrical opening's inner wall is threaded. The end cap's bottom can be perforated or imperforated.

In yet another implementation of this invention, the cylindrical end cap has at least one L-shaped gap on its top opening's wall.

BRIEF DESCRIPTION OF THE DRAWINGS

These and other features and advantages of the invention will not be described with reference to the drawings of certain preferred embodiments, which are intended to illustrate and not to limit the invention, and in which.

DETAILED DESCRIPTION OF THE INVENTION

Some embodiments are described in detail with reference to the related drawings. Additional embodiments, features, and/or advantages will become apparent from the ensuing description or may be learned by practicing the invention. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. It should be noted that references to "an" or "one" or "some" embodiment(s) in this disclosure are not necessarily to the same embodiment, and such references mean at least one.

The present invention has been conceived with the aim of addressing one or more of the current vacuum mugs' problems. More specifically, the present invention is directed to a vacuum mug that can contain large quantity of beverage, maintains the beverage temperature to sustain desired taste, and allows controlled and customizable brewing process to achieve desired taste at all beverage water-level of the beverage.

Figure 1:
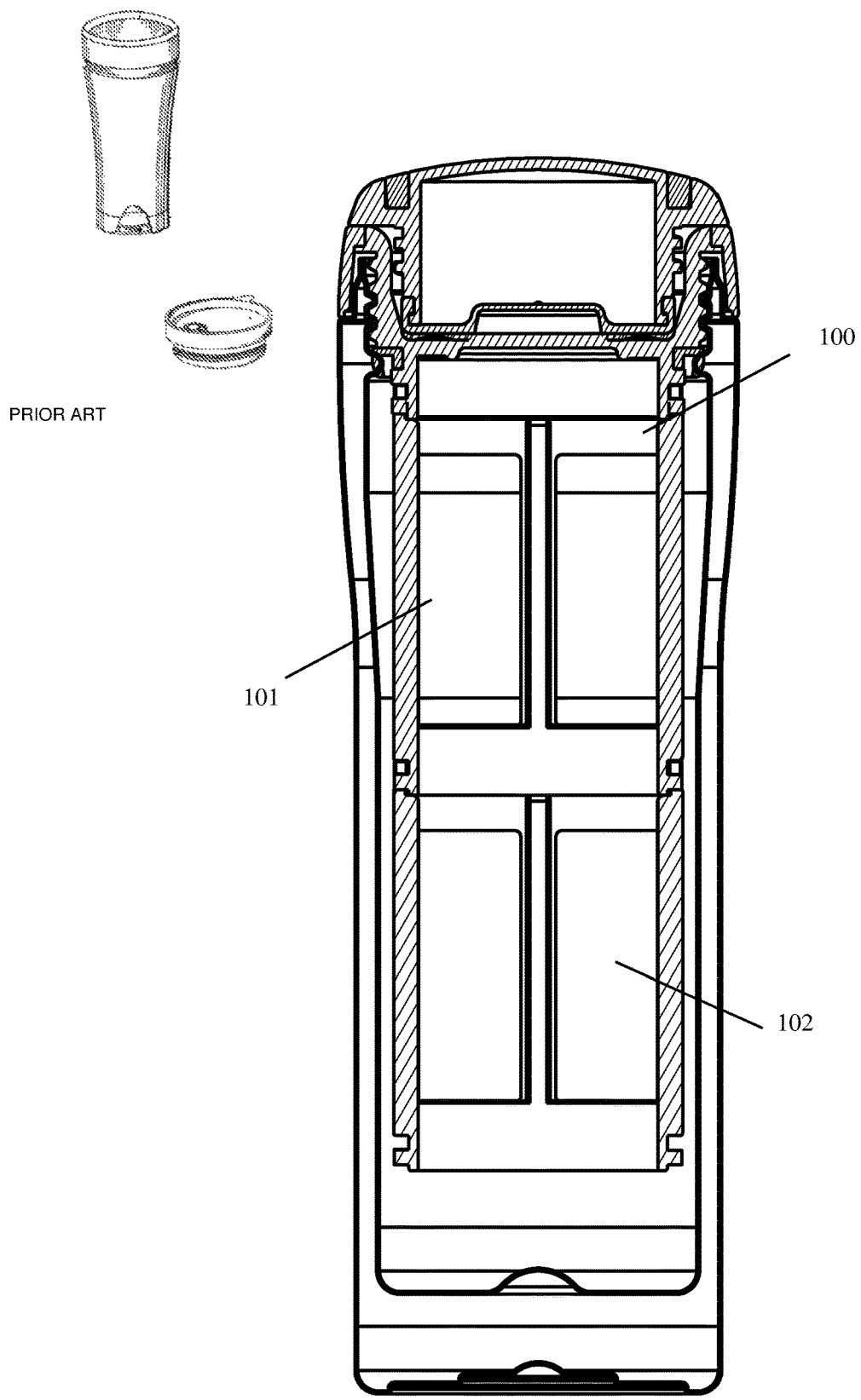
FIG. 1 shows a prior art mug with its cap and a cross sectional of an embodiment of the modular strainer/filter of the present invention.

Referring to FIG. 1, a modular filter 100 is shown assembled inside a mug. The filter, in this embodiment, has two baskets, 101 and 102. All filter baskets comprise a cylindrical top plate, a cylindrical bottom plate, and vertical posts disposed equidistantly around the perimeters of the top and bottom plates. The ends of the posts are fused to the top and bottom plates. Together, top and bottom plates and the posts form a cage structure that has a cylindrical shape. The filter basket is preferably constructed of a thermoplastic material such as polypropylene, acrylic, allyl diglycol carbonate, polycarbonate, polystyrene, polysulfone, polyester sulfone or polyester. Mesh screens, preferably made of stainless steel, are inserted circumferentially within the cage structure and between two neighboring vertical posts.

Figure 2:
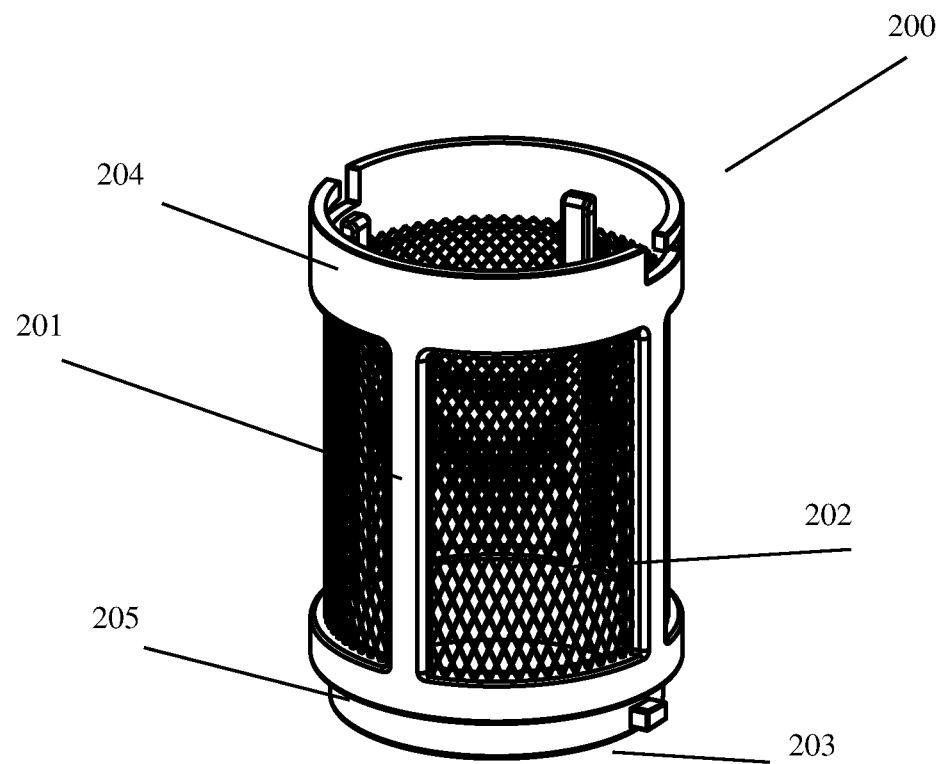
FIG. 2 is a perspective view of a filter basket of the present invention.

Referring to FIG. 2, a single filter basket 200 is shown. The filter basket 200 has a cage structure that has a cylindrical shape. The basket is preferably constructed of a thermoplastic material such as polypropylene, acrylic, allyl diglycol carbonate, polycarbonate, polystyrene, polysulfone, polyester sulfone or polyester. The cage structure's vertical posts 201 are equidistantly disposed around the cage's perimeter. Mesh screens 202, preferably made of stainless steel, are inserted circumferentially within the thermoplastic cage and between two neighboring vertical posts 201. The filter basket 200 further comprises a perforated bottom 203. The bottom 203 is preferably covered with a mesh screen. This mesh screen, like the others around the circumference of the basket, allows water and soluble solids going through, but contains the brew leftover inside the basket for easy and convenient disposal. It is also appreciated that the bottom of the basket can be imperforated. The filter basket further comprises a cylindrical top plate 204, and a cylindrical bottom plate 205.

Figure 3:
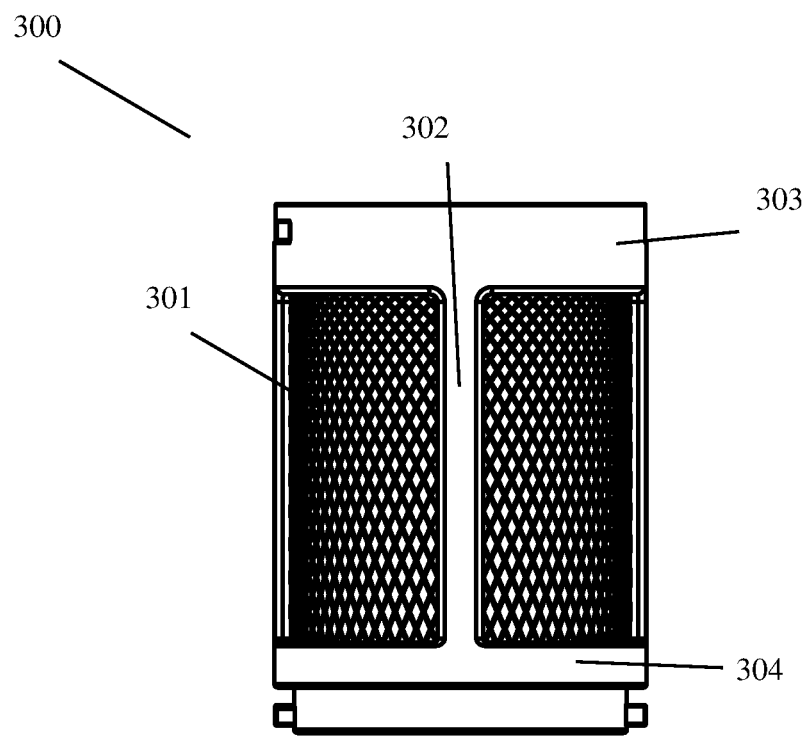
FIG. 3 is a side view of a filter basket of the present invention.

Referring to FIG. 3, a side view of a single filter basket 300 is shown. The view discloses the symmetry of the mesh screens 301 disposed on the two sides of a structural post 302. The distant sides of the mesh screens are inserted into the next posts, whose side profiles are shown. The top plate 303 and bottom plate 304 are fused with the posts to form the filter basket's cage structure. The bottom plate 304 further has top and bottom halves. The top half s outer perimeter equals the basket's. The bottom half s outer perimeter is inset and smaller than the top half s outer perimeter so that it can be received and fit in the top opening of the below filter basket.

Figure 4:
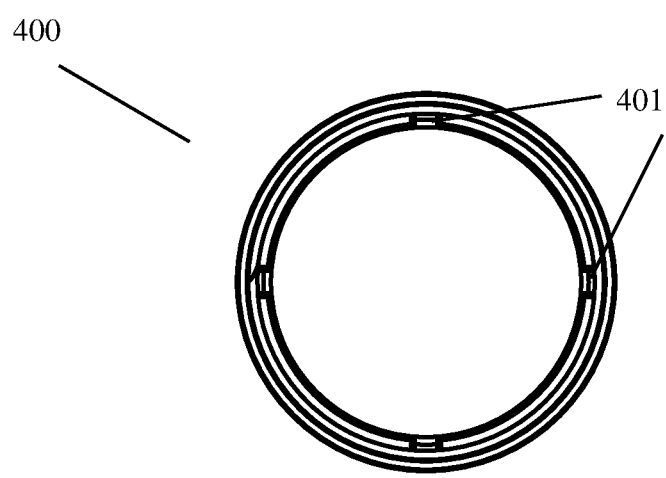
FIG. 4 is a top down view of a filter basket of the present invention.

Referring to FIG. 4, a top down view of a filter basket 400 is shown. This view discloses the basket has four posts 401 in this embodiment. Furthermore, the posts 401 are disposed equidistantly around the perimeter of the basket. In this embodiment, the basket is bottomless, and it is appreciated that this basket is stacked in the middle section of the filter unit.

Figure 5:
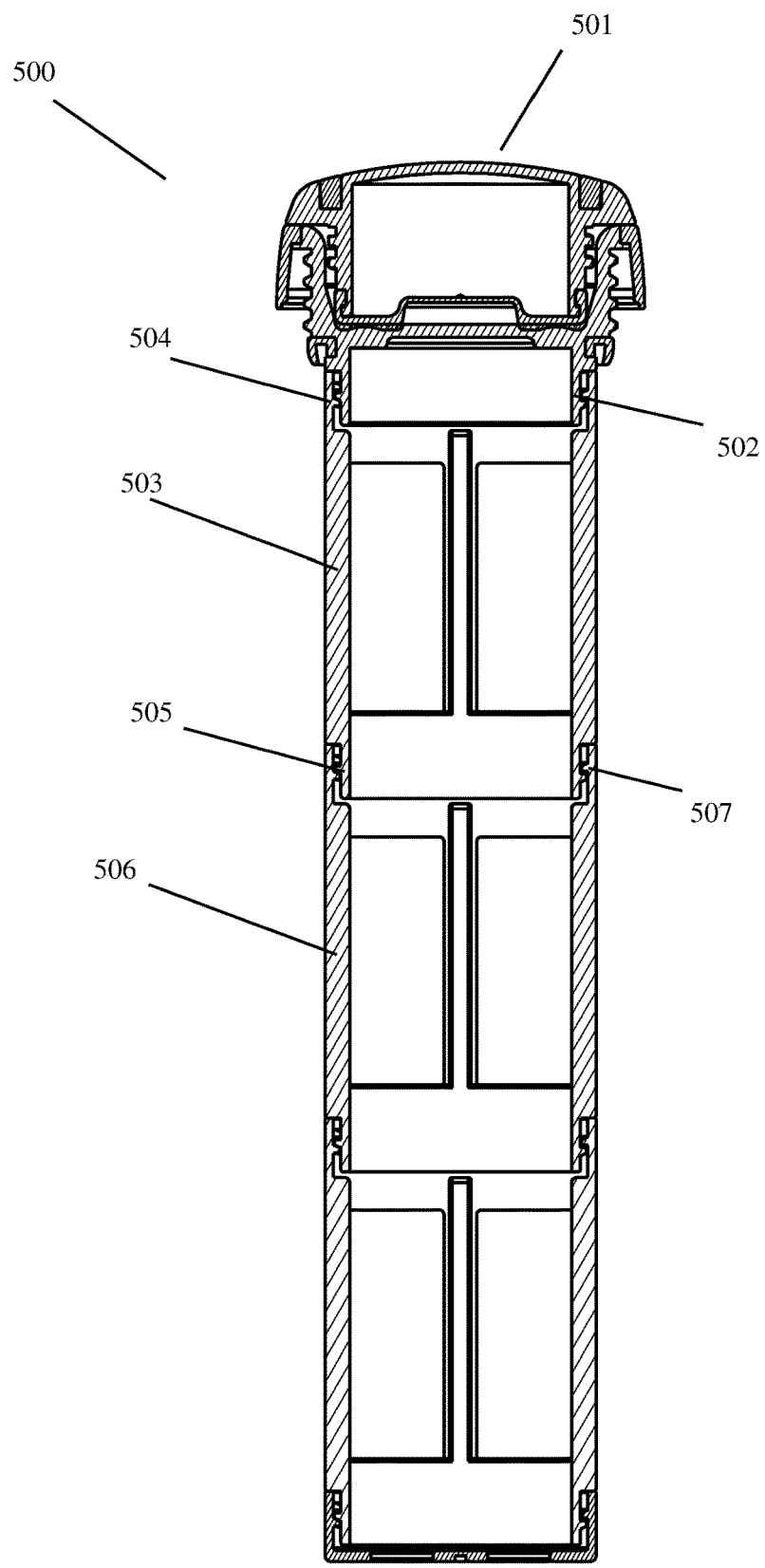
FIG. 5 is an isometric and cross sectional view of an assembled mug cap and attached modular filter baskets of the present invention.

Referring to FIG. 5, in one embodiment, a cross sectional view of a fully assembled unit 500 of a mug cap and three vertically stacked modular filter baskets is shown. In this embodiment, the unit 500 comprises a cap 501 whose bottom opening is threaded on the outside wall to allow the cap to be screwed into the opening of the topmost filter basket 503, whose opening is threaded on the inside wall. The mug cap's threads 502 mate with the topmost filter basket's threads 504 to form a tight attachment. It is appreciated that the recessed bottom of the cap 501, inside the opening, is perforated to allow the beverage through, but keep the brew leftover back. As shown, the same attachment mechanism is repeated between the filter baskets. The bottom opening of the above basket 503 is, in turn, threaded on the outside wall to allow the basket to be screwed into the opening of the below filter basket 506, whose opening is threaded on the inside wall. Basket 503's threads 505 mate with basket 506's threads 507 to form a tight attachment between the filter baskets. The three filter baskets are used to contain brew products, like ground coffee, tea leaves, flavor ingredients, and the like. How much brew products and what kind in each filter baskets are decided and customized by the user. By personal experience, the user can adjust the amount of brew products in each filter basket to achieve and sustain the desired taste until the beverage is totally consumed.

Figure 6:
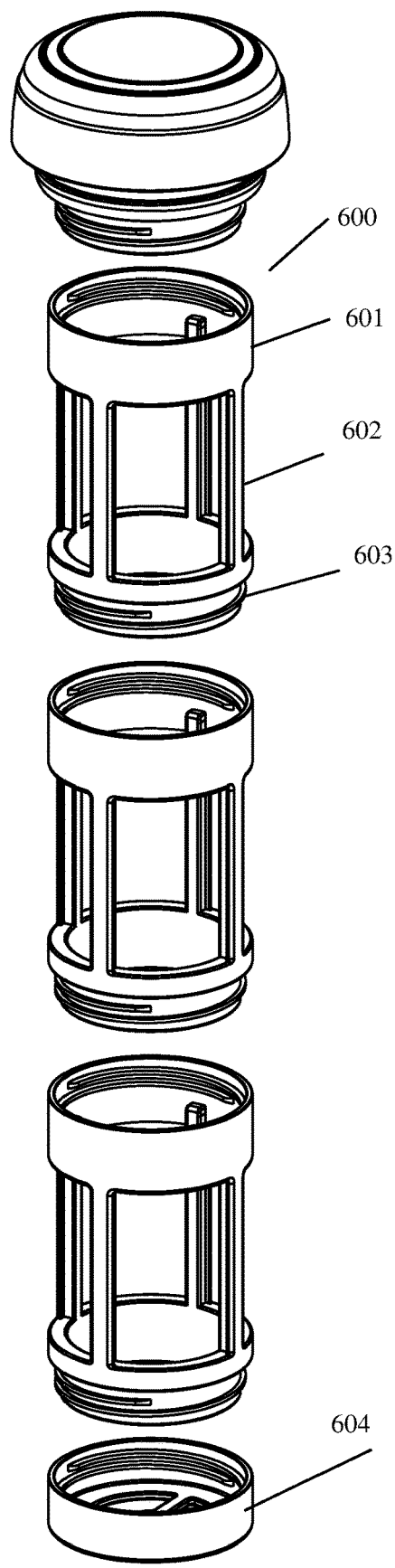
FIG. 6 is an exploded view of a mug cap and to-be-attached modular filter baskets.

Referring to FIG. 6, an exploded view of a unit of a mug cap and the filter baskets are shown to show the elements of each filter basket and illustrate how the unit is put together. In this embodiment, the cylindrical filter basket 600 comprises a cylindrical top plate 601, vertical posts 602, and a cylindrical bottom plate 603. The vertical posts are disposed equidistantly around the perimeter of the top and bottom plates. The top plate, posts, and bottom plate are fused together to form one cylindrical filter basket. It is appreciated that the spaces between the vertical posts are covered by, preferably, stainless steel meshes to contain the brew products and the brew leftover inside. The top plate 601 is threaded on the inside wall to receive the bottom opening of the cap or that of the above filter basket. The bottom plate 603 is threaded on the outside wall to allow the filter basket above to be screwed into the filter basket below. Each filter basket has a bottom to close the opening of the bottom plate. It is appreciated that the filter basket's bottom can be perforated to let liquid through, but keep the brew product back inside each filter basket. In another embodiment, the filter basket's bottom can seal the bottom plate's opening completely. Depending on the implementation of the bottoms of the filter baskets, perforated or not, an end cap 604 is needed to close off the bottom opening of the bottommost filter basket.

Figure 7:
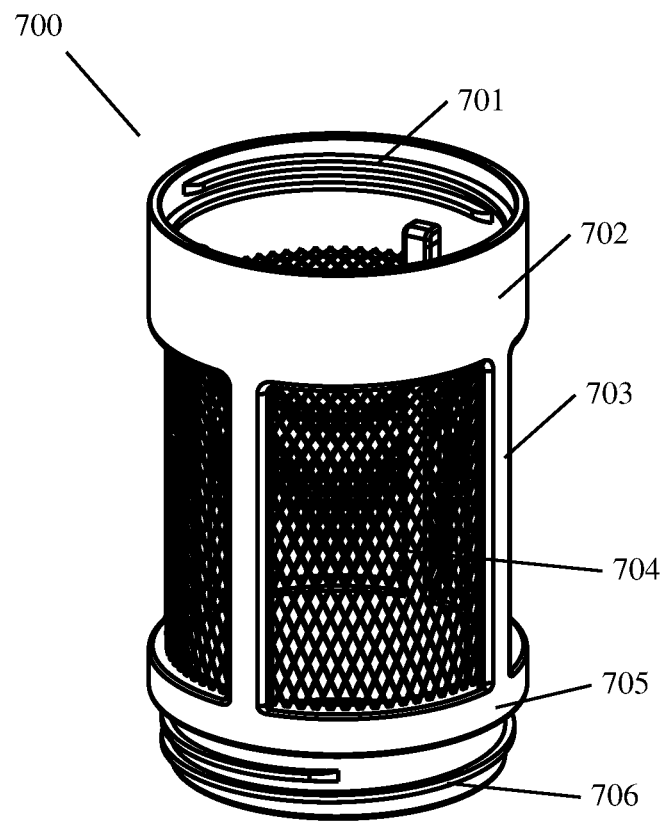
FIG. 7 is a perspective view of a filter basket of the present invention.

Referring to FIG. 7, a perspective view of a single filter basket 700 is shown. Basket 700 shows a close-up view of the basket with threads 701 on the inside of the top opening. The threads is made on the inside perimeter of the top plate 702. As disclosed above and in FIG. 6, threads 701 will mate with threads on the outer perimeter of the mug cap's bottom, or that of the next higher filter basket's bottom. The top plate is fused with posts 703 that are disposed equidistantly around the perimeter of the top plate, and, thus, the perimeter of the basket. The gaps between the posts 703 are covered with mesh screens 704 to keep the brew products and leftovers within the filter. The posts 703 are, in turn, fused with the bottom plate 705 and disposed equidistantly around the perimeter of the bottom plate. The bottom plate is threaded on the outside wall. The threads 706, as disclosed above, will mate with threads on the inside perimeter of the below basket's top opening.

Figure 8:
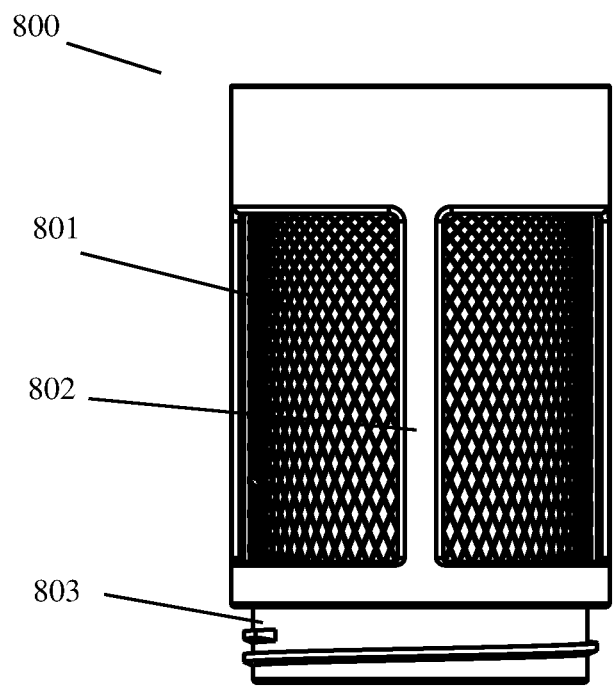
FIG. 8 is a side view of a filter basket of the present invention.

Referring to FIG. 8, a side view of a single filter basket 800 is shown. Basket 800 shows symmetrical mesh screens 801 on the left and right sides of a post 802, and, thus, shows the equidistance among the posts 802. FIG. 8 also discloses a bottom plate 803 that has the bottom half's outer perimeter being inset so that it can be screwed in the below basket's top opening as disclosed above. In this way of attachment, all outer perimeters of the filter baskets are the same, as well as the filter unit's. It is appreciated that in another embodiment the bottom plate's bottom half's outer perimeter is not inset. Rather, the top plate of the below basket is widened to receive the bottom of the above basket.

Figure 9:
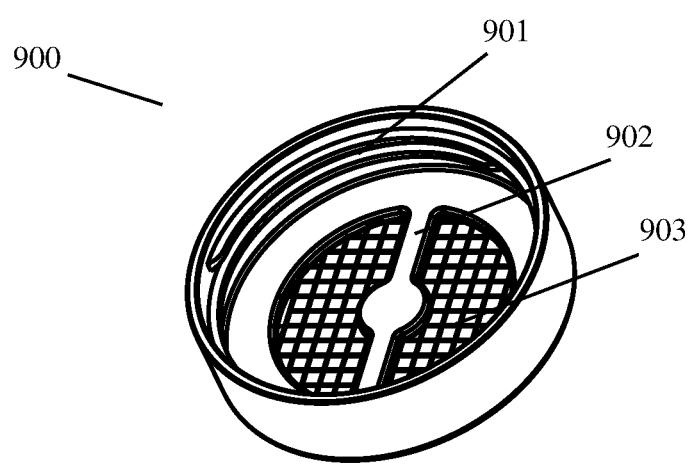
FIG. 9 is a perspective view of an end cap of the current invention.

Referring to FIG. 9, a close-up view of an end cap 900 in one embodiment is shown. In certain implementation of the current invention, an end cap is needed. In this embodiment, the end cap 900 has a cylindrical shape with the top opening open to receive the bottom of the basket and the bottom opening perforated, and is preferably made of the same thermoplastic material as a filter basket's frame. The inner wall of the cap is threaded to receive the matching threads on the outer wall of the bottom plate of the last basket in the filter basket stack. The bottom opening of the cap has a joist 902 along a diameter thereof. The joist strengthens the cap's structure, and provides more surfaces for the stainless steel mesh 903 to attach.

Figure 10:
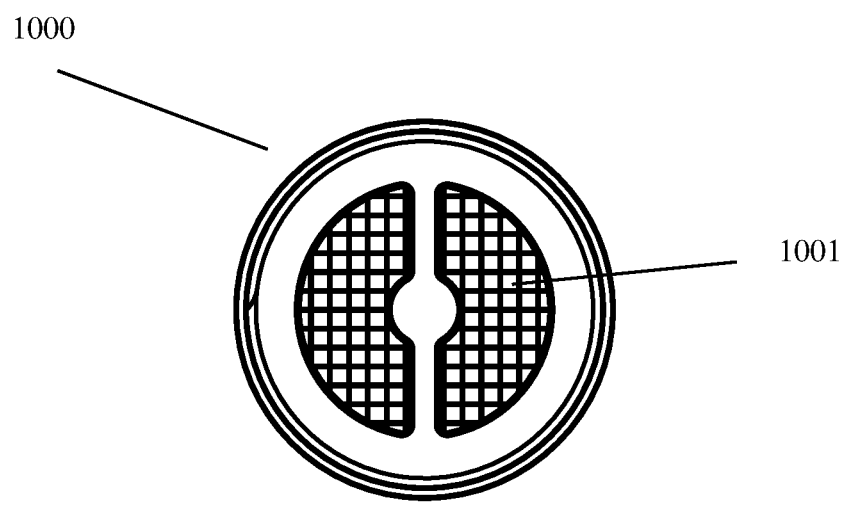
FIG. 10 is a top down view of an end cap.

Referring to FIG. 10, a top-down view of an end cap 1000 is shown. In this embodiment, the bottom of the end cap has two crescent shaped openings 1001. These openings allow liquid and soluble solids to flow freely in and out the filter. As disclosed above, in one embodiment, these openings are covered with stainless steel mesh screens to keep the brew products back inside the filter. In a different embodiment, the end cap is imperforated, and completely seals the bottom of the filter. With a sealed bottom, the mesh screens surrounding the circumference of the filter basket will perform the filtering function, and allow the liquid and soluble solids to flow in and out of the filter.

Figure 11:
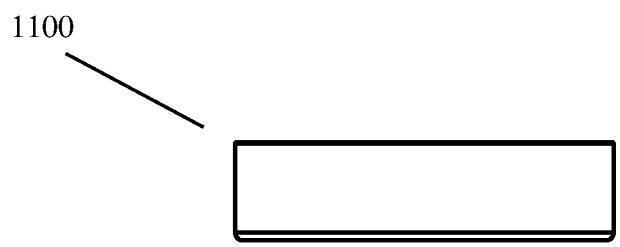
FIG. 11 is a side view of an end cap.

Referring to FIG. 11, a side view of an end cap 1100 is shown. The cap has a quarter round bottom edge for handling and aesthetic purposes.

Figure 12:
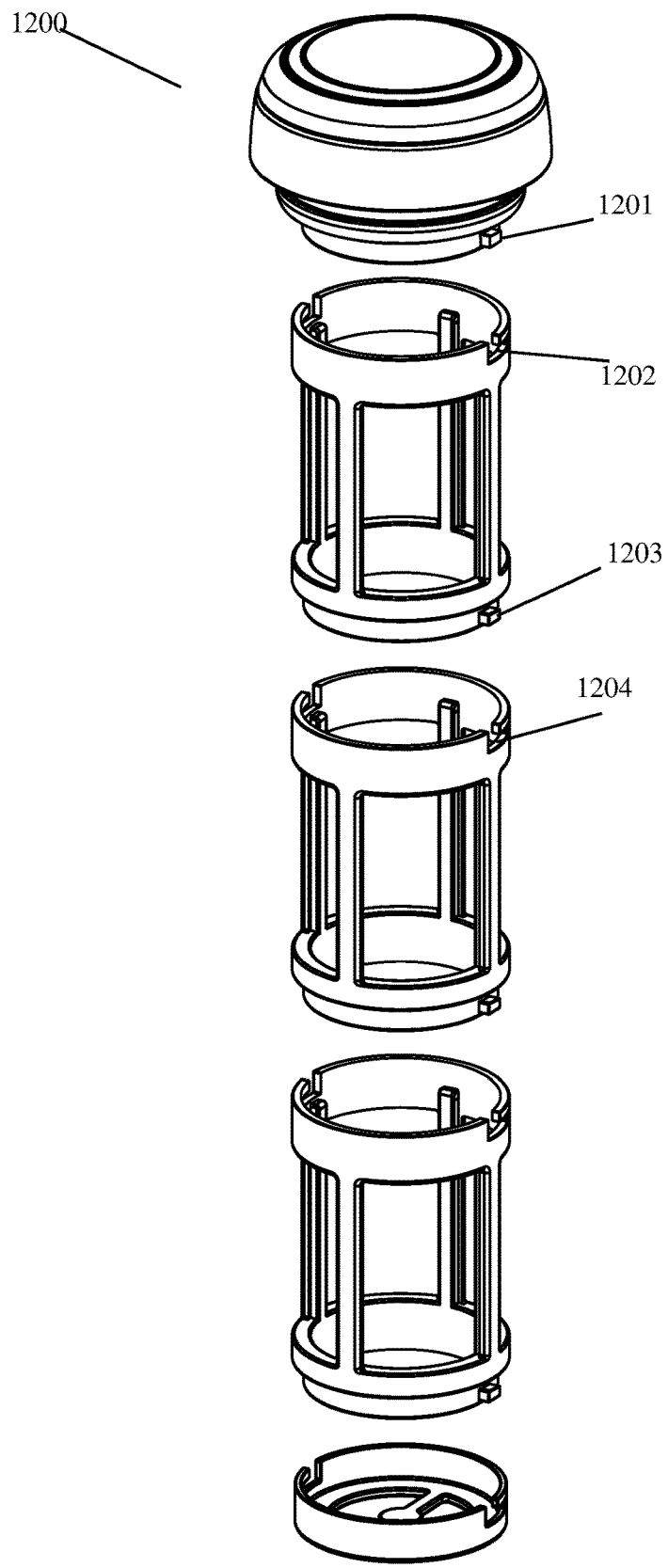
FIG. 12 is an exploded view of another mug cap and to-be-attached modular filter baskets.

Referring to FIG. 12, an exploded view of a unit 1200 of a mug cap and the filter baskets is shown. In this embodiment, the attachment mechanism is a push and turn locking mechanism. Instead of being threaded as in other embodiments, the outside wall of the cap bottom opening is smooth and unthreaded. Two tabs 1201 are disposed on the outer wall of the bottom opening of the cap. The tabs are preferably disposed across from each other. Similarly, there are no threads on the top plate of the filter basket. Instead, there are two L-shape gaps 1202 on the wall of the top plate, which are disposed to receive the corresponding tabs 1201. As the cap bottom is inserted into the filter basket opening, the protruding tabs 1201 slide in the gaps 1202. The cap and filter basket are attached when the cap is turned so that the tabs 1201 slide horizontally along the bottom of the L-shape gaps 1202 and are locked in. There are similar tabs 1203 on the outer wall of the filter basket's bottom plate, and similar L-shape gaps 1204 on the wall of the top plate of the next filter basket, and the wall of the end cap. With this method of attachment, the filter unit can be extended as long or tall as the user wants. It is preferable that the tabs are made of the same material as the cap and filter basket.

Figure 13:
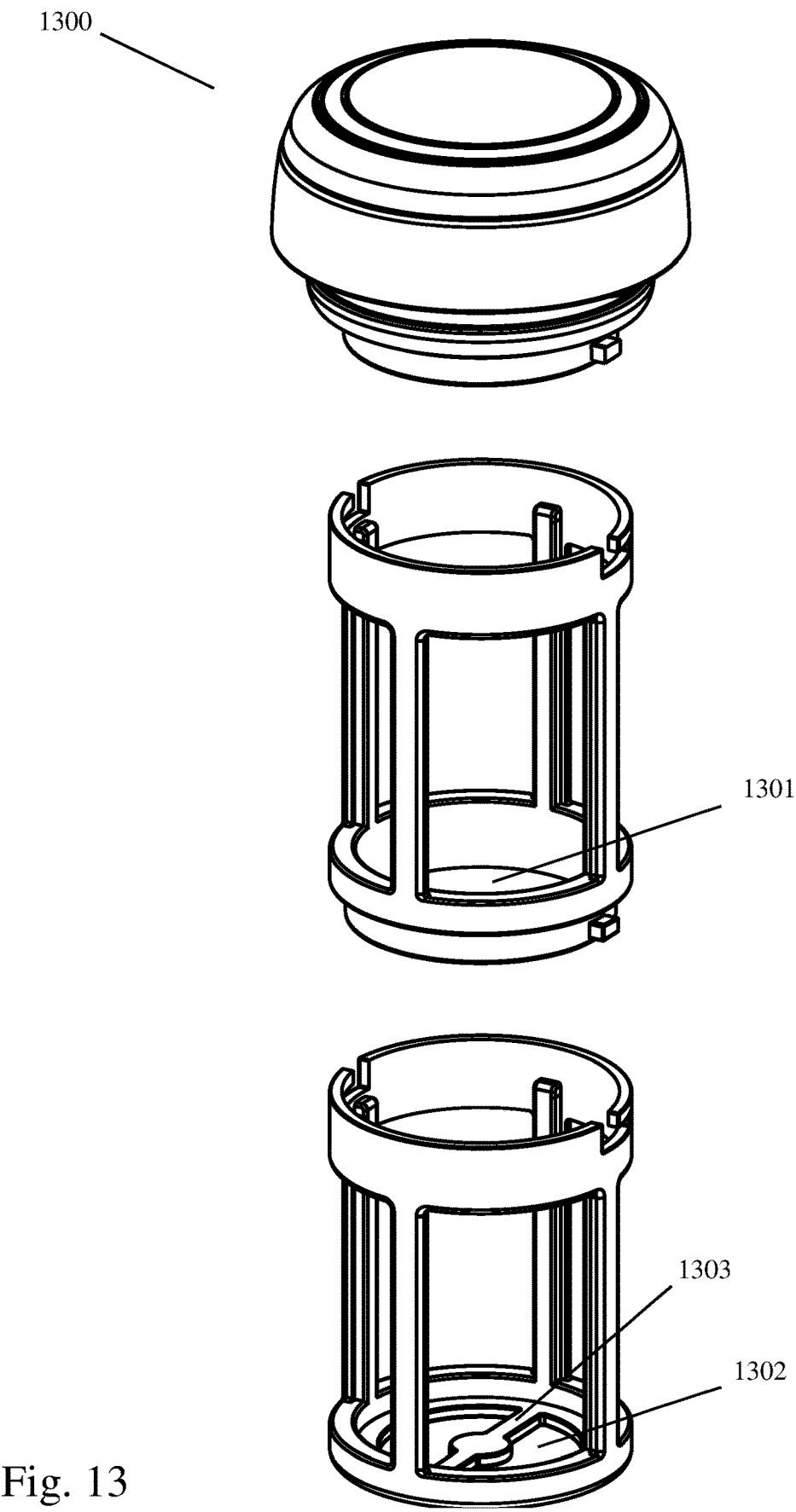
FIG. 13 is an exploded view of one embodiment of the current invention.

Referring to FIG. 13, another embodiment of the current invention is shown. In this embodiment, a unit 1300 of a mug cap and filter baskets can be attached by push-and-turn mechanism. The middle filter basket or baskets are covered with stainless steel meshes circumferentially within the thermoplastic cage like other afore disclosed embodiments. However, unlike other embodiments, the bottom 1301 of these middle filters is open without a stainless steel mesh. In this embodiment, the filter unit can be extended as much as the user likes with one or more middle filter baskets. The whole unit is bottom capped with an end filter basket made with its bottom 1302 being covered with a stainless steel mesh so that brew products and leftovers are kept in the filter. The bottom is preferably reinforced with a joist 1303 of the same material as the basket frame's along a diameter of the circular bottom.

Figure 14:
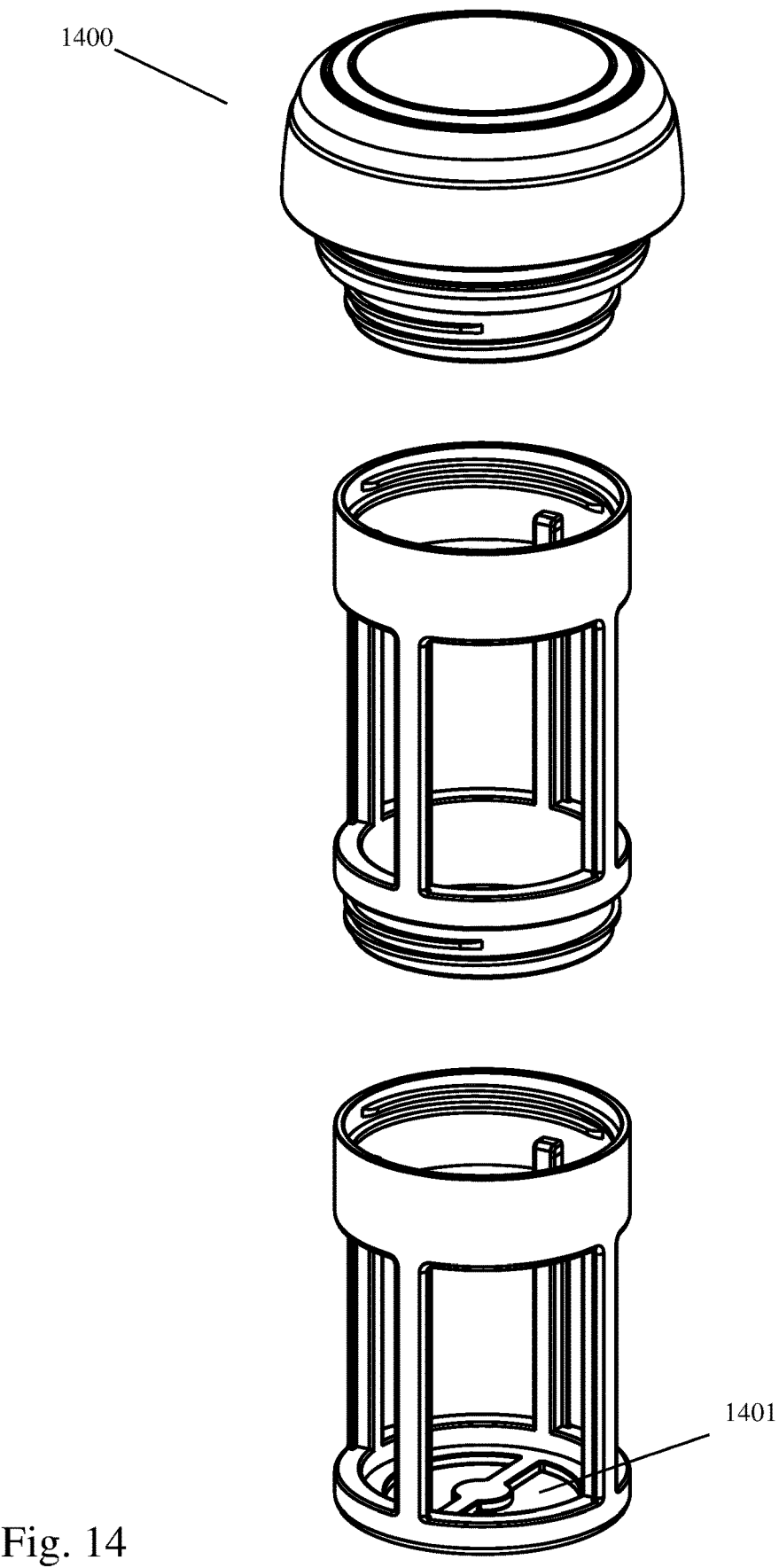
FIG. 14 is an exploded view of another embodiment of the current invention.

Referring to FIG. 14, a unit 1400 of another embodiment of the current invention is shown. In this embodiment, the filter baskets are screwed together to form a larger/taller filter unit. Similar to the embodiment disclosed above and in FIG. 13, the middle filter baskets are bottomless without any mesh screen. As disclosed above, the cap and baskets are cylindrical, and each has top and bottom plates. They are stacked and attached with mating threads; male threads on the outer wall of the bottom opening of the part above and female threads on the inner wall of the top opening of the part below. The filter unit is bottom capped with a bottom basket whose bottom 1401 is not open, but is covered preferably with a stainless steel mesh.

The invention claimed is:

1. A modular filter for a vacuum mug comprises a mug cap and at least two filter baskets;
   wherein said mug cap has a cylindrical bottom opening;
   wherein said at least two filter baskets comprise a first filter basket and a second filter basket;
   wherein each of said at least two filter baskets comprise a cylindrical top plate, at least two vertical posts, and a cylindrical bottom plate;
   wherein said at least two vertical posts of each of said at least two filter baskets are disposed equidistantly around the perimeter of said cylindrical top plate of each of said at least two filter baskets and said cylindrical bottom plate of each of said at least two filter baskets;
   wherein gaps between said at least two vertical posts of each of said at least two filter baskets are covered with stainless steel mesh screens;
   wherein said cylindrical bottom plate of each of said at least two filter baskets comprises a top half and a bottom half;
   wherein the outer perimeter of said bottom half of each of said at least two filter baskets is inset;
   wherein said outer perimeter of said bottom half of each of said at least two filter baskets is smaller than the outer perimeter of said top half of each of said at least two filter baskets;
   wherein said bottom half of said first filter basket is connected to said second filter basket;
   wherein said bottom half of said second filter basket is connected to an end cap; and
   wherein said end cap comprises at least two openings.

2. The apparatus of claim 1, wherein the bottom of each of said at least two filter baskets is perforated.

3. The apparatus of claim 1, wherein the bottom of each of said at least two filter baskets is imperforated.

4. The apparatus of claim 1, wherein said at least two filter baskets have an open bottom.

5. The apparatus of claim 1, wherein at least one tap is disposed on an outer wall of said cylindrical bottom opening.

6. The apparatus of claim 1, wherein at least one tap is disposed on an outer wall of said bottom half of each of said at least two filter baskets.

7. The apparatus of claim 1, wherein said end cap is cylindrical and has a threaded inner wall.

8. The apparatus of claim 1, wherein said end cap is cylindrical;
   wherein at least one L-shaped gap is disposed on said end cap.

9. The apparatus of claim 1, wherein said cylindrical top plate of each of said at least two filter baskets, said at least two vertical posts of each of said at least two filter baskets, said cylindrical bottom plate of each of said at least two filter baskets are fused together to form a cylindrical cage structure.

10. The apparatus of claim 1, wherein said cylindrical bottom opening has a threaded outer wall.

11. The apparatus of claim 1, wherein said cylindrical top plate of each of said at least two filter baskets has a threaded inner wall.

12. The apparatus of claim 1, wherein said bottom half of each of said at least two filter baskets has a threaded outer wall.

13. The apparatus of claim 1, wherein at least one L-shaped gap is disposed on said cylindrical top plate of each of said at least two filter baskets.

14. The apparatus of claim 1, wherein said at least two openings of said end cap are crescent shaped.

15. A modular filter for a vacuum mug comprises a mug cap and at east three filter baskets;
   wherein said mug cap has a cylindrical bottom opening;
   wherein said at least three filter baskets comprise a first filter basket, a second filter basket, and a third filter basket;
   wherein each of said at least three filter baskets comprise a cylindrical top plate, at least two vertical posts, and a cylindrical bottom plate;
   wherein said at least two vertical posts of each of said at least three filter baskets are disposed equidistantly around the perimeter of said cylindrical top plate of each of said at least three filter baskets and said cylindrical bottom plate of each of said at least three filter baskets;
   wherein gaps between said at least two vertical posts of each of said at least three filter baskets are covered with stainless steel mesh screens;
   wherein said cylindrical bottom plate of each of said at least three filter baskets comprises a top half and a bottom half;
   wherein the outer perimeter of said bottom half of each of said at least three filter baskets is inset;
   wherein said outer perimeter of said bottom half of each of said at least three filter baskets is smaller than the outer perimeter of said top half of each of said at least three filter baskets;
   wherein said bottom half of said first filter basket is connected to said second filter basket;
   wherein said bottom half of said second filter basket is connected to said third filter basket; and
   wherein said bottom half of said third filter basket is connected to an end cap.

* * * * *